Aug. 1, 1939.  R. J. MONNER  2,168,133

EXPOSURE METER

Filed May 16, 1938

Ray J. Monner
INVENTOR

BY Victor J. Evans & Co.
ATTORNEYS

Patented Aug. 1, 1939

2,168,133

UNITED STATES PATENT OFFICE 2,168,133

EXPOSURE METER

Ray J. Monner, Rapid City, S. Dak., assignor of one-third to Arthur C. McIntosh and one-third to George P. Hurst, both of Rapid City, S. Dak.

Application May 16, 1938, Serial No. 208,241

1 Claim. (Cl. 88—23)

This invention relates to exposure meters for photographic work, and its general object is to provide a meter that is used in conjunction with the pupil of the human eye, in that the principle of the meter is based upon the known fact that the pupil expands and contracts in inverse proportions to the intensity of the light to which it is subjected, and the meter includes measuring means, reflecting means and indicia indicative of the various degrees of camera diaphragm openings and shutter speeds, the measuring means gradually varying in width to coincide with the various diameters of the pupil so that the user can look at the subject to be photographed until the eye becomes adjusted to the light, then compare the diameter of the pupil with the measuring means and thereby ascertain from the indicia the proper diaphragm opening and shutter speed to be used.

A further object is to provide an exposure meter for photographic work that is simple in construction, easy to use, reliable and accurate under all light conditions, contains no moving parts, and is extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
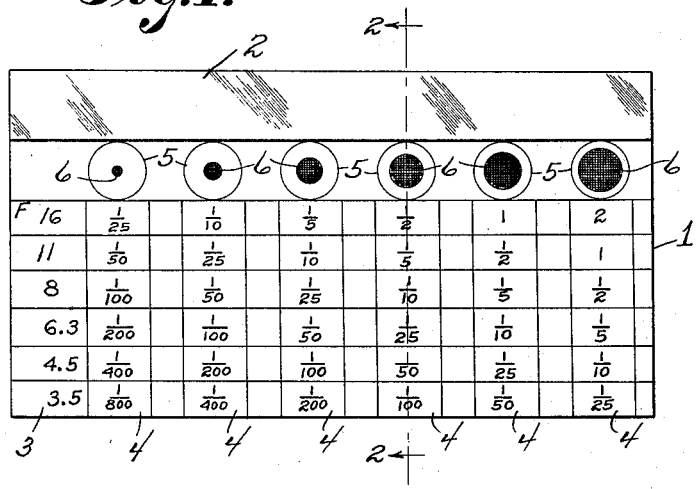
Figure 1 is a face view of one form of meter which forms the subject matter of the present invention.

Referring to the drawing in detail and particularly to Figure 1, the reference numeral 1 indicates a plate which may be made from any sheet material suitable for the purpose, and provides the body for the device, as will be apparent.

The plate 1 is shown as having secured along the upper edge portion thereof a strip 2 which may be of glass having suitable reflecting material thereon to provide a mirror, but the strip may be of metal having a highly reflecting surface. In fact, the strip 2 may be eliminated and the plate itself along the upper edge portion thereof may be provided with a reflecting surface.

In any event, the plate which is shown as being of rectangular configuration, is divided by transverse and longitudinal lines to provide spaces for arrangement of indicia in columns, and the indicia of the first column which is indicated by the reference numeral 3 are indicative of the various degrees of camera diaphragm openings while the indicia of the other columns indicated by the numeral 4 are indicative of the degrees of camera shutter speed, the indicia in the column 3 being of the standard "F" values.

Provided on the plate above each of the columns 4 are circles 5, each being of the same diameter, but each circle has arranged therein a spot 6 which gradually increase in diameter from the extreme left hand column to the right hand column. It will be obvious that the circles represent the iris of the human eye while the spots represent the pupil. The spots, circles, and indicia are preferably colored black disposed on a white background to facilitate the reading of the meter which in fact is a chart to be held in the hand of the user.

Figure 2:
Figure 2 is a sectional view taken approximately on line 2—2 of Figure 1, looking in the direction of the arrows.

From the foregoing, it will be obvious that to use the meter of the form as shown in Figures 1 and 2 the user looks at the subject to be photographed until his eyes become adjusted to the light, and then places the meter about ten inches from the eye. By glancing into the reflecting surface, the diameter of the pupil can be readily ascertained, thence the user compares the diameter of the pupil with the black spots, to select the spot that nearest corresponds to the size of the pupil, then the indicia or characters come into use, as for example suppose the third spot from the left of Figure 1 is of the same diameter or substantially so, as that of the user's pupil, the exposure time required would be one-fifth of a second for camera stop F16, one-tenth of a second for stop F11, one twenty-fifth of a second for stop F8 et cetera. When the proper information has been obtained from the chart, the camera can be set for the correct diaphragm opening and shutter speed.

Figure 3:
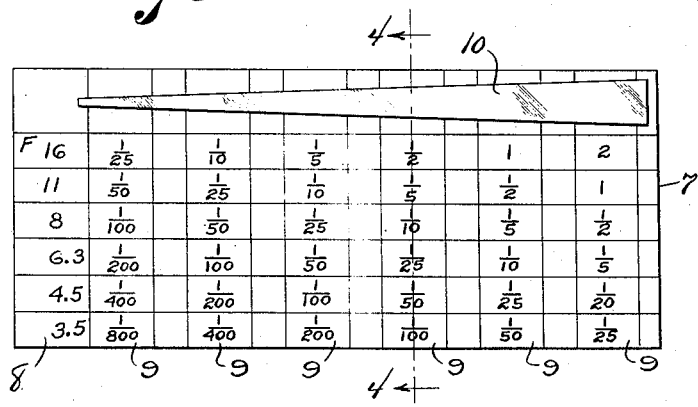
Figure 3 is a face view of a modified form.
Figure 4:
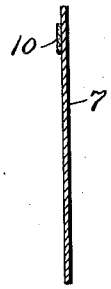
Figure 4 is a sectional view taken approximately on line 4—4 of Figure 3.

The meter or chart of Figures 3 and 4 is similar in many respects to that of Figures 1 and 2 in that it includes a rectangular plate 7 divided by transverse and longitudinal lines to provide spaces for the arrangement of indicia in columns which is identical to that of the form of Figures 1 and 2, that is the indicia of the first column 8 represents or is indicative of the various degrees of camera diaphragm openings, while the indicia of the other columns indicated by the reference numeral 9 represents the various degrees of camera shutter speed.

However, the meter of the form of Figures 3 and 4 has secured adjacent to the upper edge portion thereof a strip 10 which likewise may be of glass having suitable reflecting material thereon to provide a mirror, but the strip may be of metal having a highly reflecting surface. The strip 10 is tapered or substantially wedge shaped, in that it gradually increases in width from the left hand column 9 to the right hand column, as shown.

In the use of the form of Figures 3 and 4, it will be apparent that the user glances into the reflecting surface of the strip 10 and moves the meter toward the right until the pupil is reflected at a point where the diameter of the pupil equals the width of the reflecting surface at that point. The exposure time required will then be found in the column below that point, then by referring to the column 8 the correct setting for the diaphragm opening can be ascertained.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

An exposure meter for use with a camera including a diaphragm and a shutter, and said meter comprising a plate having a chart thereon including columns of characters representing the various degrees of camera diaphragm openings and shutter speeds, reflecting means arranged in strip formation along the upper portion of the plate, measuring means on the plate and including circles and spots arranged in row formation parallel with and below the reflecting means and each spot being disposed concentrically within a circle, each circle being of the same diameter and representing the iris of a human eye, said spots each representing the pupil of the human eye and gradually increasing in diameter from one end of the row to the other to correspond with the various diameters of the pupil under varying light conditions, said spots cooperating with the reflecting means to ascertain the diameter of the pupil of the eye of a user of the meter, and said columns of characters being arranged below the spots and with respect thereto and with each other for cooperative association of the characters and spots to ascertain the correct settings of the diaphragm and the shutter.

RAY J. MONNER.